Patented Nov. 10, 1936

2,060,573

UNITED STATES PATENT OFFICE 2,060,573

CONDENSATION PRODUCTS OF PHENOLS AND TRIISOBUTYLENE

William F. Hester, Drexel Hill, Pa., assignor to Röhm & Haas Company, Philadelphia, Pa.

No Drawing. Original application March 23, 1932, Serial No. 600,826. Divided and this application September 14, 1934, Serial No. 744,016. In Great Britain February 24, 1933

8 Claims. (Cl. 260—154)

This invention relates to alkylated phenols and to a process for preparing them by the condensation of diisobutylene, triisobutylene and similar materials with phenol and substituted phenols.

(Tetramethylbutyl) phenol is a new compound which is believed to be either the ortho- or the para- derivatives, namely 2- or 4-($\alpha,\alpha,\gamma,\gamma$-tetramethyl) butylphenol having following probable constitution:—

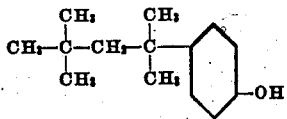

The term (tetramethylbutyl) phenol refers to compounds of the above description.

One object of this invention is to produce (tetramethylbutyl) phenol in high yield and purity by a very simple and economical method.

Another object of this invention is to provide (tetramethylbutyl) phenol as a new compound which is adapted for use as an antiseptic, fungicidal, or bactericidal agent; or as an intermediate for preparing dyestuffs, artificial tanning agents, wetting-out agents, and pharmaceutical preparations.

A further object of this invention is to provide a method for preparing substituted (tetramethylbutyl) phenol and higher homologues and substitution products thereof such as (triisobutyl)-, and (diisoamyl) phenols, in which the phenolic nucleus may contain halogen, alkyl-, aryl-, or nitro groups as additional substituents, it being understood that the term "phenols" as used herein refers to either monocyclic, polynuclear, or polycyclic phenols.

Other objects will appear hereinafter.

In accordance with my invention, I have found that when a mixture of phenol and diisobutylene in reacting proportions, preferably equimolecular amounts, is treated with a very small quantity of concentrated sulphuric acid, i. e. an amount of sulphuric acid substantially less than a molecular equivalent quantity; at a temperature preferably below 70° C., and for best results at about 0–25° C., condensation occurs smoothly to form (tetramethylbutyl) phenol in practically quantitative yield. The amount of sulphuric acid (96% strength) used may be as low as 0.075 mol. per mol. of phenol. An amount of 96% sulphuric acid corresponding to about 0.13–0.30 mols per mol. of phenol gives excellent results. As the quantity of sulphuric acid is increased, or if the temperature is not kept low, oily or resinous products are formed which decrease the yield. If, however, the proper precautions are taken to keep the temperature at about 10–25° C. and to use small quantities of sulphuric acid added slowly with stirring over a period of time as described in more detail below, practically no ethers or deleterious by-products are formed, and the mixture sets to a gel which rapidly solidifies to a hard crystalline mass of (tetramethylbutyl) phenol. This may be purified, if necessary, by washing with water or by recrystallization from light petroleum or other suitable medium.

This reaction, involving what appears to be a catalytic condensation induced by the presence of small amounts of sulphuric acid was entirely unexpected, since it had already been known in the art that phenol condenses with diisobutylene in the presence of a molecular equivalent amount of concentrated sulphuric acid at or below 0° C. to give chiefly (tetramethylbutyl) phenylether (Niederl and Natelson, Jour. Amer. Chem. Soc. 53,276 (1931)) instead of (tetramethylbutyl) phenol.

Other para-alkylated phenols have, it is true, in the past, been prepared by the action of equimolecular amounts of an unsaturated hydrocarbon such as isoamylene or styrene upon phenol in a cold mixture of 1 volume of concentrated sulphuric acid and 9 volumes glacial acetic acid, in the ratio of about 2 parts by weight of sulphuric acid to 1 part of phenol (Konig. Ber. 24, 3889 (1891)); or by the condensation of phenol with alcohols in the presence of 10–15 mols of 70–80% sulphuric acid at 60–80° C. (Meyer and Bernhauer, Monatshefte 53–54, 721–752 (1929)). Such processes are not applicable, however, for preparing (tetramethylbutyl) phenol from phenol and diisobutylene, due to the extreme ease with which resinous or oily bodies are thereby formed. (Tetramethylbutyl) phenol is very susceptible to the action of heat and excessive amounts of acid and cannot be obtained under such strenuous conditions.

The example below illustrates the preferred manner of making (tetramethylbutyl) phenol, it being understood of course, that the quantities of the reactants may be varied to a considerable extent and that the length of time of reaction, the strength of the sulphuric acid, as well as the temperature may have to be varied somewhat when larger or smaller sized batches are made or when the rate of stirring is different.

*Example 1.*—In a vessel which is resistant to sulphuric acid such as any glass, enameled or lead-lined kettle fitted with a rapidly rotating stirrer, there is placed a mixture of substantially equimolecular quantities of phenol and diisobutylene, say 94 grams phenol and 112 grams diisobutylene. The diisobutylene used is obtained by treating tertiary butyl alcohol with 50% sulphuric acid according to methods already known. It should preferably boil between 101° and 103° C. at normal pressure. Such a product is reasonably free from isobutylene and tri-isobutylene. According to Whitmore and Wrenn (Jour. Amer. Chem. Soc. 53, 3136 (1931)) it consists of two isomeric trimethyl-pentenes namely 2,4,4-trimethylpentene-1 and 2,4,4-trimethylpentene-2.

To the above mixture of phenol and diisobutylene which has been cooled to 15–18° C. there is gradually introduced 2–4 grams of 96% of sulphuric acid added dropwise or in a slow stream with constant and vigorous agitation.

During and shortly after the addition of acid there is a tendency for the temperature to rise to 30–35° C. and the mixture becomes completely fluid. Cooling is then applied with stirring, so that a temperature of 20–25° is reached as quickly as possible. Then the remainder of 15 grams of 96% sulphuric acid (0.15 mol.) is added very slowly during 20–30 minutes while the temperature is held at 20–25° C. After about 1½ hours of stirring, crystals of (tetramethylbutyl)phenol begin to separate. The mixture gradually becomes more viscous due to the formation of crystals. This next forms a gel and finally sets to a hard crystalline cake. The latter is removed and washed thoroughly with water to remove sulphuric acid and traces of sulphonic acids or unchanged phenol. The crude (tetramethylbutyl)phenol forms colorless needlelike crystals which are filtered off and dried. Upon recrystallization from petroleum ether it shows a melting point of 84–85° C. The yield varies from about 85% to 95% of the theoretical quantity.

(Tetramethylbutyl)phenol is only very slightly soluble in water. It dissolves readily in organic solvents such as alcohol, ether, chloroform, and benzene but is soluble only to a limited extent in cold petroleum ether or ligroin. With aqueous solutions of caustic alkalies such as sodium hydroxide or potassium hydroxide it produces phenates which are only very slightly soluble in water and which have a soapy consistency.

To prove that the compound is actually a phenol and not an ether, the (tetramethylbutyl)phenol obtained above was boiled in excess sodium hydroxide solution with mono-chloracetic acid, whereby the (tetramethylbutyl)phenoxy acetic acid derivative, M. P. 108–109° C. (recrystallized from ligroin) was obtained.

Despite the fact that diisobutylene consists of two isomeric trimethylpentenes, only one (tetramethylbutyl)phenol is formed. The reaction may be formulated as follows:

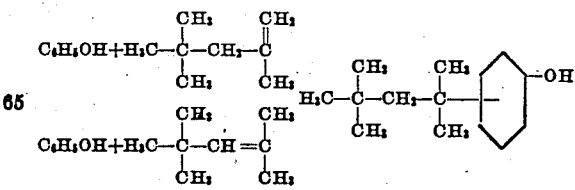

It is obvious that in the above process the proportions and temperatures, as well as the concentration of the sulphuric acid may be varied to some extent without departing from the scope of this invention.

*Example 2.*—A mixture of 108 grams (1 mol.) of o-cresol and 112 grams (1 mol.), diisobutylene is treated gradually with 31.3 grams (0.3 mol.) of 96% sulphuric acid at about 10–15° C. with cooling as described in Example 1. After stirring for about 5 hours, the reaction product which forms a viscous oil, is washed thoroughly with water, steam distilled to remove unchanged diisobutylene, etc., and set aside to crystallize. The waxy product thus obtained forms colorless crystals melting at 49–50° C. after recrystallization from petroleum ether.

This is the melting point of the product Niederl obtained by rearranging diisobutyl o-cresyl ether to the phenol (Jour. Amer. Chem. Soc. 53, 276 (1931)).

*Example 3.*—To a mixture of 94 g. (1 mol.) of phenol and 112 g. (1 mol.) of diisobutylene stirred at 25° is slowly added 23 g. (0.15 mol.) of phosphorus oxychloride. The temperature rises rapidly to 40°. An ice bath is used to prevent the temperature from going above 40°. After 15 minutes the bath is removed and the mixture is stirred for 4 hours at room temperature. The viscous oil is washed with water and steam distilled to remove unchanged phenol and diisobutylene. The residue crystallizes on cooling. These crystals, washed with petroleum ether, melt at 82–84°; mixed with the product from Example 1 they melt at the same temperature.

*Example 4.*—To a mixture of 144 grams (1 mol.) of 2-naphthol (betanaphthol) and 112 grams (1 mol.) of diisobutylene is slowly added with stirring 14.7 grams (0.15 mol.) of 94% sulfuric acid. The temperature rises rapidly to about 70° and the almost dry mixture becomes a liquid which sets to a solid in about 10 minutes, the temperature rising to 78°. The crude product is taken up in ether, washed with 10% potassium hydroxide solution to remove unchanged 2-naphthol, and recrystallized from petroleum ether to give (tetramethylbutyl)naphthol melting at 128–9°.

*Example 5.*—To a mixture of 108 grams (1 mol.) of paracresol and 112 grams (1 mol.) of diisobutylene is slowly added with stirring 31.3 grams (0.3 mol.) of 94% sulphuric acid. The product is purified as in Example 2. The (tetramethylbutyl) p-cresol melts at 46–47°.

*Example 6.*—To a mixture of 100 grams of phenol and 148 grams of triisobutylene (boiling point 175–186° C./735 mm.), there was added dropwise, 40 grams of 66° Bé. sulphuric acid, keeping the temperature between 28 and 32° C., and stirring constantly. The mixture was then allowed to stand at room temperature for 24 hours after which it was washed at 90 to 95° C. with 1500 c. c. of water containing a slight excess (about 1%), of sodium hydroxide over the amount required to neutralize the sulfuric acid used. An oily layer separated which was washed several times with 1500 c. c. of boiling water to which some sodium chloride was added if necessary in order to break the emulsion. About 5 grams of dry sodium carbonate was then added to the oil after which it was distilled in vacuo. The sodium carbonate was added to neutralize any sulfonic acid which might have been formed and which would cause cracking during distillation. 120 grams of an oil boiling between 120 and 170° C. at 3 mm. pressure was obtained which on cooling crystallized to a waxy crystalline material.

*Example 7.*—The triisobutylene used contains a great many isomers. Of these, five were isolated from 100 gallons of technical triisobutylene and each isomer was condensed as above with phenol. The following results were obtained:

A. 100.4 grams of phenol 148 grams of triisobutylene (boiling point 175.6°/735 mm.). This mixture was condensed as above using 43.1 gr. of 66° Bé. sulfuric acid. 115 grams of an oil distillate boiling at 118 to 165° C./3 mm. pressure was obtained. On redistillation this production yielded the following:

22 grams of solid (boiling point 113–133°/4 mm. pressure).

58 grams of a solid (boiling point 134 to 140° C.) at 3 to 4 mm. pressure.

25 grams of viscous oil (boiling point 142 to 167° C.) at 3 mm. pressure.

B. 104.5 grams of phenol and 154 grams of triisobutylene (boiling point 175.9° C./735 mm. pressure) were condensed by means of 44.9 grams of sulfuric acid at 66° Bé. 135 grams of an oil boiling at 131 to 175° C. at 3 mm. was obtained which on redistillation gave the following:

28 grams of solid (boiling point 112 to 132° at 3 mm. pressure);

66 grams of solid (boiling point 133 to 142° C. at 3 mm. pressure;

32 grams of viscous oil (boiling point 143 to 169° at 3 mm. pressure.

C. 104.2 grams of phenol, 154 grams of triisobutylene (boiling point 176.2° C./735 mm. pressure) was condensed by means of 44.7 grams of sulfuric acid, of 66° Bé. 138 grams of an oil distillate boiling at 112 to 178° C. at 3 mm. pressure was obtained which on redistillation yielded the following:

35 grams of solid boiling at 104 to 132° C. at 3 mm. pressure;

61.5 grams of solid boiling at 132 to 140° C at 3 mm. pressure;

33.5 grams of a viscous oil boiling at 141 to 169° at 3 mm. pressure.

D. 110 grams of phenol and 162 grams of triisobutylene (boiling point 183.9° C. at 735 mm.) were condensed by means of 47.1 grams of sulfuric acid of 66° Bé. 76 grams of a distillate boiling at 134 to 159° C. at 3 mm. pressure, was obtained.

E. 114 grams of phenol and 168 grams of triisobutylene boiling at 186.6° C. at 735 mm., were condensed by means of 49 grams of sulfuric acid of 66° Bé. 117.5 grams of an oil boiling at 135 to 164° C. at 3 mm. was obtained.

In order to bring about the condensation of a phenol with triisobutylene, a larger quantity of the condensing agent, particularly sulfuric acid is required than is the case with diisobutylene. The preferred range of acid concentration is between 0.2 and 0.5 mol. of acid per mol. of phenol.

Whereas in the case of diisobutylene, the two isomers mentioned above both give the same product on condensation with phenol, the products obtained by condensing phenols with triisobutylene are mixtures of various isomers, even though it is possible that a single isomer was used for the condensation. For this reason it is not possible to assign any definite formula to the products obtained by condensing phenols and triisobutylene.

Instead of using sulphuric acid in the above condensations one may use other acidic condensing agents notably anhydrous zinc chloride, ferric chloride, aromatic or aliphatic sulphonic acids, phosphoric acid, phosphorus pentoxide and hydrogen halides. The yield and purity of the product is, however, inferior to that obtained by the use of sulphuric acid as a condensing agent.

In the above reactions with diisobutylene and triisobutylene, other phenols and substitution products thereof may be used in lieu of phenol itself, such as chlorphenols, cresols, chlorcresols, nitrophenols, phenylphenols, naphthols, phenolsulfonic acids, and the like to yield the corresponding substitution products.

It is also understood that inert solvents may be used in the condensation to promote better agitation or for obtaining a more homogeneous mixture; such solvents as water, trichlorethylene, carbon tetrachloride and the like being suitable therefor.

It is apparent to one versed in the art that variation can be made in the temperatures, conditions of operation, etc., set forth in the above examples without departing from the spirit of the invention the scope of which is limited only by the following claims.

This application is a division of my copending application No. 600,826, filed March 23, 1932.

I claim:—

1. The process of condensing triisobutylene and a monohydroxy phenol comprising treating a substantially equi-molecular mixture of triisobutylene and the phenol with concentrated sulfuric acid in an amount substantially less than a molecularly equivalent quantity.

2. The process of condensing triisobutylene and a monohydroxy phenol comprising treating a substantially equi-molecular mixture of triisobutylene and the phenol with an amount of concentrated sulfuric acid equivalent to substantially 0.2 to 0.5 mol. per mol. of phenol.

3. The process of condensing triisobutylene and a monohydroxy phenol comprising treating a substantially equi-molecular mixture of triisobutylene and the phenol with an amount of concentrated sulfuric acid equivalent to substantially 0.2 to 0.5 mol. per mol. of phenol at a temperature of substantially 0 to 70° C.

4. The process of condensing triisobutylene and a monohydroxy phenol comprising treating a substantially equi-molecular mixture of triisobutylene and the phenol with an amount of concentrated sulfuric acid of substantially 96% strength, in an amount equivalent to substantially 0.2 to 0.5 mol. per mol. of phenol, at a temperature of from 0 to 25° C.

5. The process of condensing triisobutylene and a monohydroxy phenol comprising treating a substantially equi-molecular mixture of triisobutylene and the phenol with an acidic condensing agent in an amount substantially less than a molecularly equivalent quantity.

6. The process of condensing triisobutylene and a monohydroxy phenol comprising treating a substantially equi-molecular mixture of triisobutylene and the phenol with an amount of an acidic condensing agent equivalent to substantially 0.2 to 0.5 mol. per mol. of phenol.

7. The condensation product of a monohydroxy phenol and triisobutylene, said condensation product having a free phenolic hydroxyl group.

8. The condensation product of phenol and triisobutylene, said condensation product having a free phenolic hydroxyl group.

WILLIAM F. HESTER.